United States Patent [19]

Chen

[11] 4,090,500
[45] May 23, 1978

[54] COOKING APPARATUS

[76] Inventor: James T. C. Chen, 1526 Cherrywood Dr., San Mateo, Calif. 94403

[21] Appl. No.: 751,266

[22] Filed: Dec. 17, 1976

[51] Int. Cl.² .............................................. A47J 37/12
[52] U.S. Cl. .................................................. 126/391
[58] Field of Search ........................ 126/389, 391, 390; 99/447

[56] References Cited

U.S. PATENT DOCUMENTS 1,115,303  10/1914  Geffroy ............................ 126/391 X
2,059,623  11/1936  Braach .............................. 126/391

Primary Examiner—Edward G. Favors
Attorney, Agent, or Firm—Stephen P. Fox

[57] ABSTRACT

A cooking apparatus includes a vessel having a flue extending vertically therethrough. A gas heater is disposed beneath the flue. Food is boiled in water contained in the vessel. The bottom of the vessel is curved, and the flue is configured with a restriction in the lower portion thereof to provide even distribution of heat applied to the vessel.

8 Claims, 3 Drawing Figures (PRIOR ART)

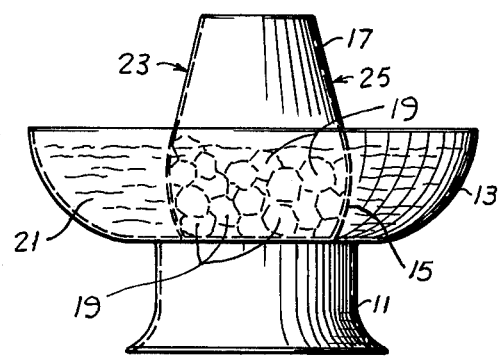
Fig_1 (PRIOR ART)
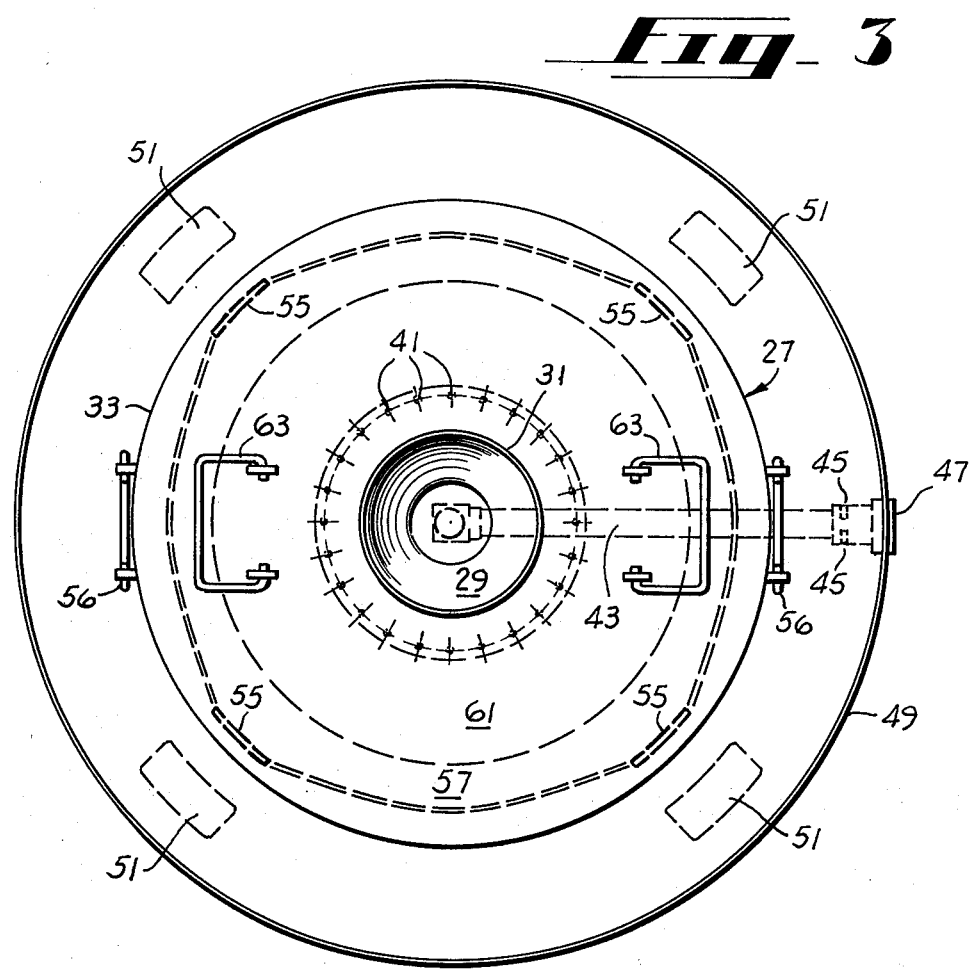
Fig_3

COOKING APPARATUS

BACKGROUND OF THE INVENTION

This invention relates generally to cooking vessels and more particularly to cooking vessels in which food is boiled in water.

One type of cooking apparatus often used by persons at a dining table is known as a Mongolian pot. The pot is filled with water which is brought to a vigorous boil by applying massive amounts of heat. Thereafter prepared raw food is placed in the boiling water and cooked.

Heretofore known Mongolian pots are configured so that the pot surrounds a container filled with charcoal. The charcoal is burned to provide the massive heating of the pot. In use, charcoal has the disadvantage that smoke and ashes from the burning charcoal are dirty and unpleasant. In addition, the heat is difficult to control. Burning charcoal in the container produces very hot spots on the walls, particularly above the upper surface of the charcoal. Consequently, heating of the water and food in the pot is not uniform. A particular problem is that the food being cooked often sticks to the walls of the pot at the hot spots produced by the burning charcoal, with consequent charring of the food particles.

SUMMARY OF THE INVENTION

The present invention provides a Mongolian pot type of cooking apparatus which in the illustrated embodiment includes a vessel having an internal vertical flue. Water and food in the vessel surround the walls of the flue. The vessel is formed with a curved bottom, and a constriction in the lower portion of the flue. Beneath the flue there is a disposed a gas burner having a ring of gas jets vertically aligned with the lowermost portion of the curved bottom of the vessel. With this arrangement, improved circulation of heated water is produced inside the vessel. In addition, the flue configuration eliminates hot spots on the walls of the vessel, so that food in the vessel does not stick to the walls and become charred. As a result, the food is cooked more efficiently and uniformly.

BRIEF DESCRIPTION OF THE DRAWINGS

FIG. 1 is a cross-sectional view of a charcoal burning Mongolian pot of the type heretofore known in the art.

FIG. 3 is a top view of the cooking apparatus illustrated in FIG. 2.

DESCRIPTION OF THE PREFERRED EMBODIMENT

Figure 2:
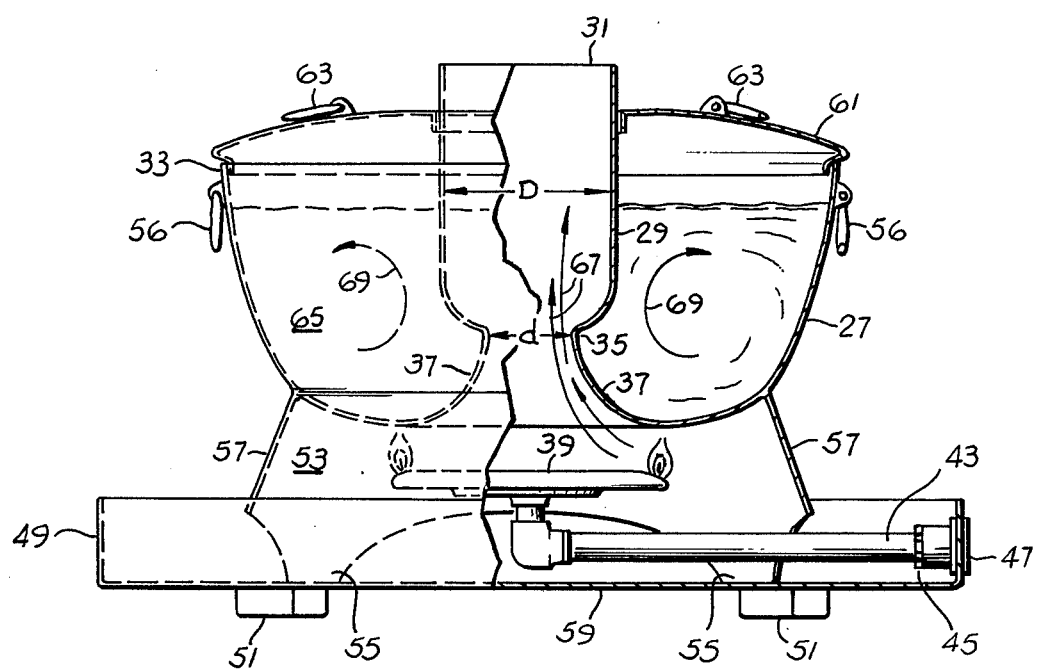
FIG. 2 is a partial cutaway side view of one embodiment of the cooking apparatus of the present invention.

Referring to FIG. 1, there is shown a cross-section of a Mongolian pot of the type commonly used by persons at dining tables. A base 11 supports a vessel 13. Disposed in the center of vessel 13 is a container 15 having a tapered flue 17. Container 15 is partially filled with coal 19. Water 21 in vessel 13 surrounds container 15. In use, the water is first heated to a vigorous boil by the burning charcoal 19. Thereafter, prepared raw food is placed in the water and cooked.

It can be seen that with the Mongolian pot of FIG. 1, heating of the water is accomplished primarily through the portion of the side walls of container 15 which are below the water line. Thus, the water and immersed food particles nearest these side walls are heated more vigorously than the water and food near the outer periphery of vessel 13. In addition, the burning charcoal in container 15 produces hot spots on the side walls, for example, in the region of points 23, 25 as shown. Food particles which come in contact with these regions usually stick thereto and ultimately become charred. Thus, the food is not cooked uniformly.

FIGS. 2 and 3 illustrate a Mongolian pot constructed according to the principles of the present invention. A vessel 27 is formed to define an internal flue 29 extending vertically through the center of the vessel. Flue 29 has an upper portion 31 which terminates above the horizontal plane of the outer periphery 33 of vessel 29. In horizontal cross-section, the vessel has the shape of an annulus defined by the wall of flue 29 and the outer periphery 33 of the vessel, as can best be seen by reference to FIG. 3.

The lower portion of flue 29 has a constriction therein as indicated at point 35 in FIG. 2. The diameter d of the flue at the most constricted point is preferably less than one-half the diameter D of the upper portion of the flue. Thus, the cross-sectional area of the flue at the constriction is preferably less than one-fourth the cross-sectional area of the flue above the constriction.

The bottom of vessel 27 is rounded so as to form a curved funnel extending upwardly toward the constriction in the flue. The curved sidewalls of the funnel are indicated at 37 in FIG. 2.

Vessel 27 is heated by means including a gas or propane burner 39 disposed beneath flue 29 in spaced relation to the vessel. As shown, burner 39 has an outer periphery which is vertically aligned with the lowermost portion of the rounded bottom of vessel 27. Gas jets 41 (FIG. 3) are disposed at the periphery of burner 39 so as to provide a ring of flame beneath the vessel. Gas is directed to jets 41 internally of burner 39 and through a supply pipe 43 equipped with air intake openings 45 and a fitting 47 for connection to a source of combustible gas such as a propane or butane tank (not shown).

Gas burner 39 is supported in a pan 49 having feet 51. Removably disposed in pan 49 is a base 53 having legs 55. Vessel 27 is attached to the base 53. Handles 56 on the sides of the vessel facilitate removal. The heat from the gas flame is shielded from the external environment by means including the side walls 57 of base 53 and the bottom 59 of pan 49.

A cover 61 is removably disposed on the top of vessel 27. The cover is configured to define an internal aperture through which flue 29 extends. Cover 61 includes a pair of handles 63.

In use, the gas flame from burner 39 heats the bottom of vessel 27 and water 65 contained therein. The flame creates a flow of intensely heated air along an extended path, beginning at the curved bottom of the vessel and moving upwards through the flue 29, as indicated by direction lines 67. The constriction at point 35 serves to center the flow of heated air in the flue, away from the upper side wall of the flue, thereby to maintain reduced temperatures in the upper side wall area. Thus, hot spots on the upper side wall are eliminated, and food particles immersed in the vessel near the water surface will not stick to the flue side wall and become charred.

By heating the rounded bottom of the vessel and by providing an extended path for heated air through the flue constriction, heating efficiency and water circulation in the vessel are improved. In general, the water in the vessel circulates as shown by the direction lines 69. The water circulation promotes uniform cooking of the food.

Gas burner 39 provides a source of a clean, easily adjustable heat, free of smoke and ashes during the cooking process. Upon completion of cooking, the vessel 27 and attached base 53 can easily be removed from pan 49 and cleaned.

I claim:

1. A cooking apparatus comprising:

a vessel for containing a liquid, said vessel being formed to define an internal flue extending vertically therethrough, said flue having an open top and a constriction in the lower portion thereof below the surface of the liquid;

said vessel having a curved bottom extending upwardly toward the constriction in said flue; and means for heating said vessel, said heating means being disposed beneath said flue in spaced relation to said vessel and having a periphery vertically aligned with the lowermost portion of said curved bottom.

2. The apparatus of claim 1, wherein the cross-sectional area of said flue at said constriction is less than one-fourth the cross-sectional area of said flue above said constriction.

3. The apparatus of claim 1 wherein said vessel has an annular horizontal cross-section.

4. The apparatus of claim 1, wherein said heating means includes a gas burner.

5. The apparatus of claim 4, said gas burner having gas jets disposed at the outer periphery of said burner.

6. The apparatus of claim 4, further including heat shielding means disposed beneath and around said gas burner.

7. The apparatus of claim 1, wherein said internal flue terminates above the plane of the outer periphery of said vessel.

8. The apparatus of claim 7, further including means removably disposed on said vessel for covering the top thereof, said covering means being configured to define an internal aperture for receiving said flue.

* * * * *